United States Patent [19]

Smith

[11] 4,288,665
[45] Sep. 8, 1981

[54] ELECTRIC SWITCH CONTROL UNIT, MORE PARTICULARLY FOR ELECTRIC MOTOR DRIVEN ACTUATORS

[75] Inventor: Frederick A. Smith, Bristol, England

[73] Assignee: Rotork Limited, Bath, England

[21] Appl. No.: 26,308

[22] Filed: Apr. 2, 1979

[30] Foreign Application Priority Data

Apr. 4, 1978 [GB] United Kingdom ............... 13152/78

[51] Int. Cl.³ .............................................. H01H 3/00
[52] U.S. Cl. .................................. 200/18; 200/153 R
[58] Field of Search ............... 200/17, 18, 35 R, 38 R, 200/39 R, 47, 61.2, 61.21, 153 T, 321, 322, 325

[56] References Cited

U.S. PATENT DOCUMENTS

3,319,019  5/1967  Jullien-Davin .................... 200/38 R
3,941,956  3/1976  Delin et al. ......................... 200/61.2

Primary Examiner—James R. Scott
Attorney, Agent, or Firm—Stevens, Davis, Miller & Mosher

[57] ABSTRACT

A control unit responsive to axial movements of a motor shaft coupled to an actuator. The control unit provides torque and limit switches which are connected to disable the electric motor. The rotation of the output shaft of the actuator is used to operate limit switches in the control unit so that the motor will be deenergized when the actuator has moved to its full limit or when an excessive torque is encountered. Limits are established by connecting a counting mechanism to the electric motor output shaft. The actuator is controlled in first and second directions by first and second switches. A switch actuator is associated with each switch which is latched into position by the motion of the actuator members. The latch member prevents relative movement of the actuator until the motor direction is reversed, thereby preventing hammering and repeated actuation of said motor upon detection of the torque limit.

11 Claims, 24 Drawing Figures

ELECTRIC SWITCH CONTROL UNIT, MORE PARTICULARLY FOR ELECTRIC MOTOR DRIVEN ACTUATORS

This invention relates to control units containing switch mechanisms whereby ancillary circuits or operations are controlled by the movement of a primary apparatus. In particular the invention is concerned with an electric switch control unit operable by an electric motor driven actuator whereby the movement of the actuator operates the control unit for operating controlling circuits for the actuator.

The invention has a particular use with valve actuators of the kind described in our U.K. Patent Specifications Nos. 842,581, 865,565 and 939,353. Such valve actuators include an output spindle or shaft which is capable of rotary movement to open or close the associated valve. The output shaft is selectively rotated by manual means or by a motor driven shaft or spindle operating through a worm and wormwheel. The motor spindle or shaft is mounted for limited axial movement in response to the torque required for moving the valve to the desired position. The control unit of the present invention is operable to utilize the rotary movement of the output shaft to operate limit switches, for example for de-energizing the motor of the actuator when a predetermined position has been reached in either direction of movement. The control unit is furthermore capable of utilizing the axial movement of the motor spindle or shaft to operate torque/limit switches which control the motor circuit of the valve actuator.

Control units of the kind described above are in fact, well known. One such control unit, described in our U.K. Patent Specification No. 1,003,761, utilizes combined torque and limit switches which allows the torque and limit switch operations to be combined and interlocked in one complete mechanism.

The present invention sets out to provide an electric switch control unit having an improved torque/limit switch mechanism including an anti-hammer function, and torque switch cut-out at any point in the actuator stroke.

A further object is to provide an actuator which includes a basic counting mechanism having a simple setting device whereby the switch mechanism needs no overload clutch or safety device, and provides also means for setting the switches to control the valve travel without the necessity of knowing the number of turns of the valve. The improved switch mechanism of the present invention provides an electric switch control unit which has the following features and which thereby makes the total control of the valve operation by the actuator efficient, foolproof and reliable.

In its broadest aspect the invention provides a control unit for an electric motor driven actuator, said control unit comprising a pair of switches each connected in an electric circuit, one switch for controlling the operation of the actuator motor in one direction of movement of the actuator and the other switch for controlling the operation of the actuator in the other direction of movement, a switch actuator for each switch for operating the corresponding switch at any point during the stroke of the actuator in accordance with the output force (torque) or output movement (limit) of the actuator, a latch member, means interconnecting said switch actuators with said latch member, said latch member being operable to lock one or other of said switch actuators in its switch operated position upon actuation of said switch actuator during operation of said actuator in a first direction of movement, said latch member being operable to release said actuator switch upon movement of said actuator in the other direction of movement.

The various features of the electric switch control unit of the invention will now be described separately in detail with reference to a preferred embodiment of the invention which is given by way of example only. These features of the improved electric switch control unit are as follows:

1. Basic counting mechanism with limit switch operation and setting mechanism for valve stroke.
2. Torque switch operation and adjustment utilizing the axial movement of the actuator wormshaft.
3. Anti-hammer function operable at any point during valve stroke.
4. Torque/limit switch latch operable at any point during stroke.
5. Torque switch cut-out operable at any point during stroke.
6. Torque/limit selection.
7. Flashing lamp indicating travel of the valve.
8. Zero set and Scale set.

The preferred embodiment of the invention as mentioned above is shown in the attached drawings in which.

The embodiment of the electric control unit as shown in the drawings is particularly applicable to electric motor driven valve actuators of the kind having a hand-/auto arrangement and which include a motor shaft or spindle which by means of a worm and wormwheel drives an output shaft which may be manually operated if desired.

The casing of the actuator supports the motor shaft on which is mounted a worm engaging a wormwheel on the output shaft. The output shaft is provided with a worm meshing with a wormwheel on a secondary shaft which extends through a partitioned wall of the casing into an auxiliary casing. The auxiliary casing contains the control unit of the invention which is also operable by a shaft loosely coupled with the motor shaft. As will be hereinafter explained the control unit is responsive to the axial movements of the motor shaft or spindle and also the rotational movements of the output shaft through the secondary shaft to operate torque and/or limit switches which are connected in the electrical control circuits for the electrical motor of the valve actuator.

As mentioned above, the secondary shaft is rotated in accordance with rotation of the output shaft of the valve and this movement is utilized normally to operate limit switches in the control unit so that the motor will be de-energized when the valve has moved to its fully open or closed positions.

FEATURE 1

Basic counting mechanism with limit switch operation and setting mechanism for the valve stroke.

In the electric switch control unit of the present invention there is a counting mechanism for the "open" direction of movement of the valve and a separate counting mechanism for the "close" direction of movement of the valve. As a function of operation for each counting mechanism is exactly the same except for the direction of rotation, the following description is given for the "close" direction of movement only.

Figure 1:
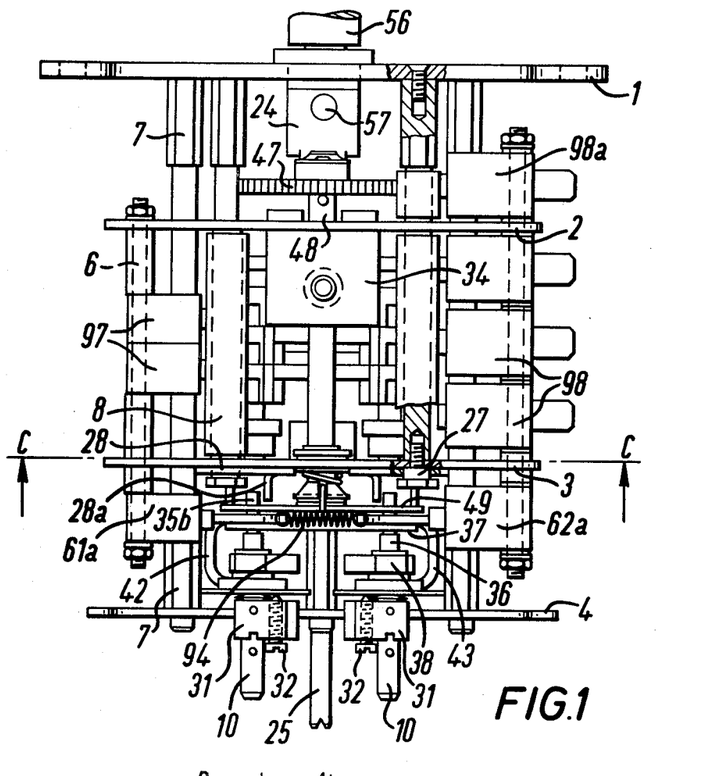
FIG. 1 is a plan view of the control unit with the improved switch mechanism.
Figure 12:
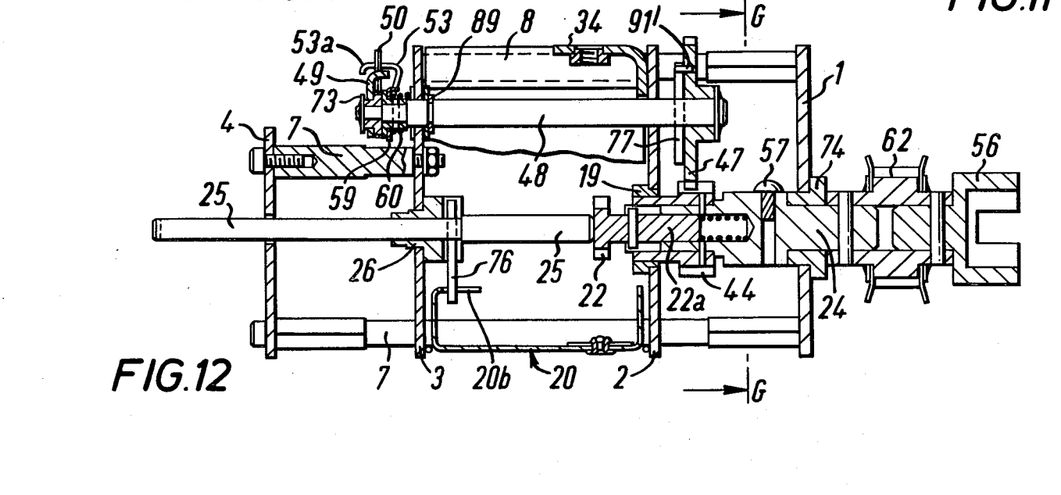
FIG. 12 is a section on the line A—A of FIG. 2.

Referring to FIG. 1 and 12 of the drawings, the electric switch control unit includes a central drive shaft 24 which is carried in bushes 19 and 74 located respectively in the back plate 2 of the counter mechanism and the back plate 1 of the control unit. The shaft 24 is coupled with the secondary output drive shaft of the actuator by means of a coupling 56 which is connected with shaft 24 through a drive pulley assembly 62.

Figure 2:
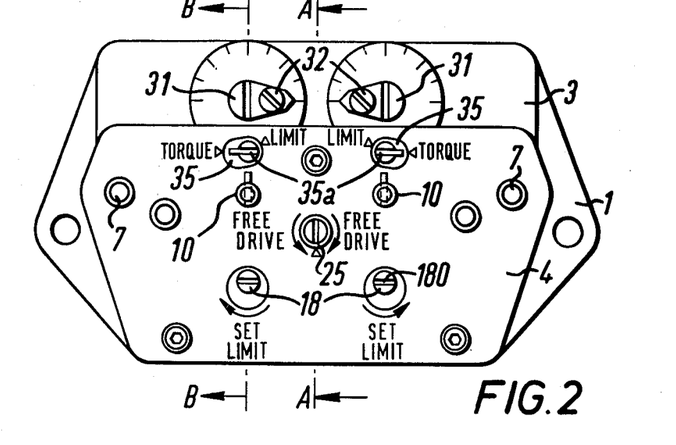
FIG. 2 is a front view of the unit showing the location of the adjustments available on the front plates.

The electric switch control unit includes also a front counter plate 3 and a main front plate 4 (see FIG. 2).

The counter gears of the counter mechanism are located between plates 2 and 3 and in the plan view of FIG. 1 the "close" counting mechanism to be described is located on the left-hand side of the central drive shaft 24. The counter back plate 2 and the front plate 3 are positioned in correct parallel relationship by means of counter plate pillars 6, whilst the front and back plates 1 and 4 of the control unit are connected by support pillars 7.

Figure 9:
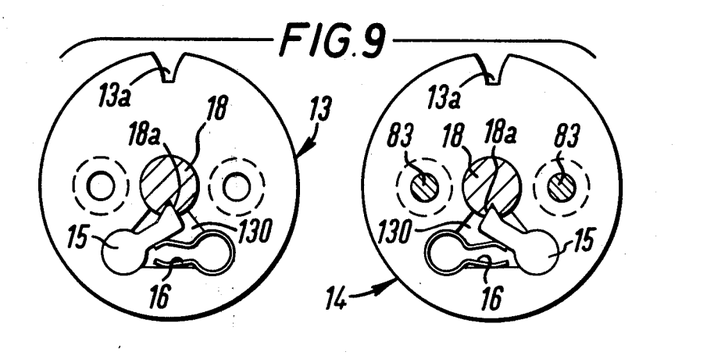
FIG. 9 is an enlarged view of the counter gears showing the pawl and spring assembly.
Figure 10A:
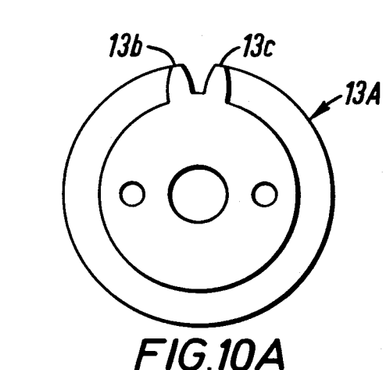
FIG. 10A is an enlarged front view of the counter gear section of a counter gear assembly.
Figure 10B:
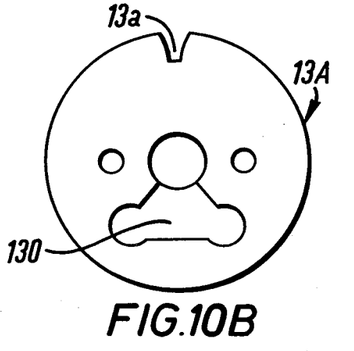
FIG. 10B is an enlarged rear view of the counter gear section of a counter gear assembly.

Each counting mechanism includes a counter shaft 18 (see also FIG. 4) on which are positioned a plurality, for example, three identical counter gear assemblies (13, 14) as shown in FIG. 9. The counter gear assemblies on the shafts 18 are driven by a common drive pinion 22 (FIG. 12) which is carried by a shaft 22a resiliently mounted in and driven by drive shaft 24.

Figure 11:
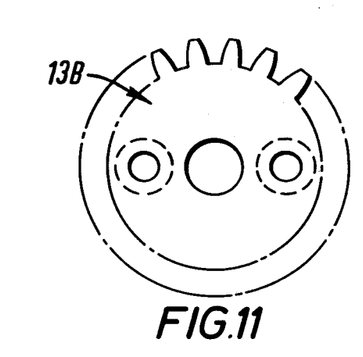
FIG. 11 is an enlarged view of the back gear portion of a counter gear assembly.

Each counter gear assembly consists of a counter gear 13A (FIG. 10) to which is fixed a counter gear back 13B (FIG. 11) by means of pins 83 (FIG. 9) which traps a pawl 15 and a pawl spring 16 inside a space 130 on the rear face of the gear 13 13A. Each counter gear assembly can be made right-hand or left-hand by exchanging the position of the pawl 15 and pawl spring (see the enlarged view of the counter gears in FIG. 9), and the left-hand assembly is used for the "close" direction of movement of the valve. The counter shaft 18 has an angular section groove 18a (FIG. 9) formed axially along its length and is mounted in bushes 39 in plates 2 and 3, being retained axially in position by means of a circlip 89 and a lock washer 72. The counter shaft extends forwardly and projects through the front plate 4 (FIGS. 2 and 4). The counter gear assemblies 13, 14 are axially located on the shaft 18 by means of lock washers 71 and they also have interspaced washers 17 (FIG. 4).

The purpose of the spring loaded pawl 15 in each counter gear assembly is to allow the free rotation of the counter gear assemblies on the counter shaft 18 in one direction when driven by the common drive pinion 22, but to be driven by the pawls 15 when the counter shaft 18 is driven in the same direction by a screwdriver in the slot 180 provided in the counter shaft end projecting from the front plate 4. This will be described in greater detail hereinafter in the method of operation of the mechanism.

Each counter gear assembly is so formed that the back gear portion 13B (FIG. 11) is a gear of twenty teeth, the face width of which is approximately one-third of the total width of the assembly. One of the teeth 13a is projected through the second one-third of the total width of the assembly, the remainder of the periphery being a plain diameter, and for the final one-third of the width of the assembly the single tooth form becomes two full gear teeth 13b and 13c. The position of the single tooth form 13a relative to the pawl position is of great importance and must be precisely the same on each gear to ensure that when the counter shaft 18 is rotated and the pawls engage in the groove 18a in the counter shaft 18, the single tooth 13a is exactly in line through the three counter gear assemblies.

Figure 3:
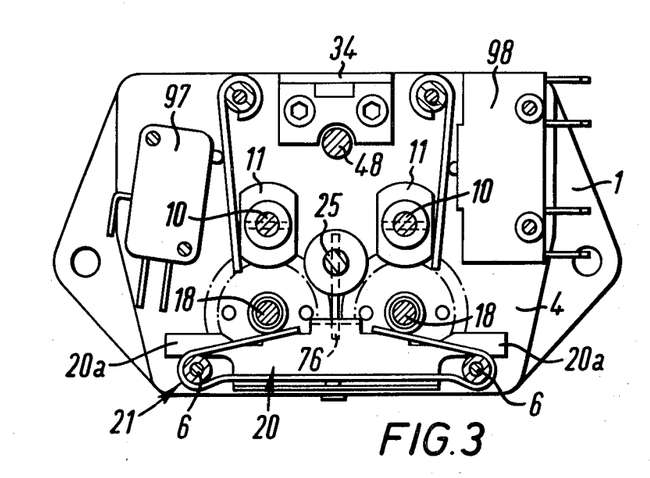
FIG. 3 is a section on the line C—C of FIG. 1.
Figure 4:
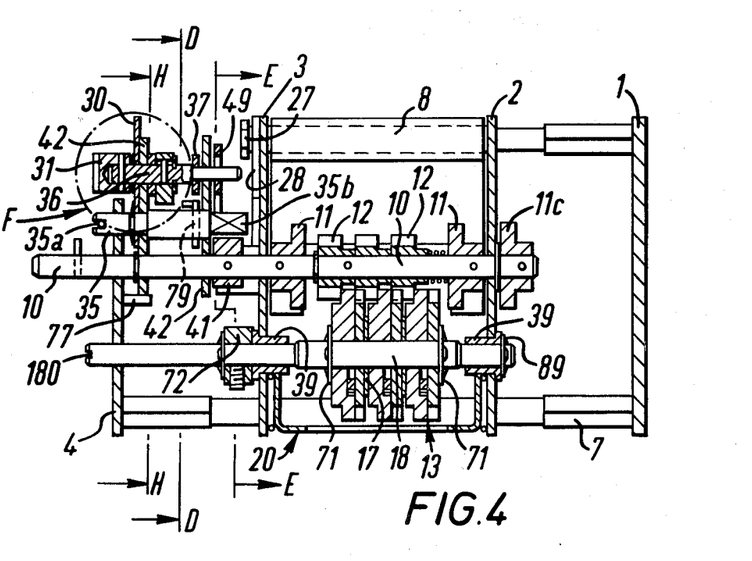
FIG. 4 is a section on the line B—B of FIG. 2.

The bushes 39 carrying the counter shaft 18 are positioned in slotted holes in the counter front and back plates 2, 3 and they are retained in their operating positions by the counter shaft springs 21 which urge the counter gear assemblies into mesh (FIG. 3).

Meshing with the three counter gears are three counter pinions 12 (see also FIG. 14) which are positioned on a counter pinions shaft 10 (FIG. 4) which is also mounted in the counter back plate 2 and the counter front plate 3.

Figure 14:
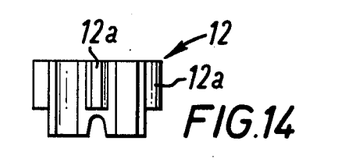
FIG. 14 is a side elevation of a counter pinion of the counting mechanism.
Figure 15:
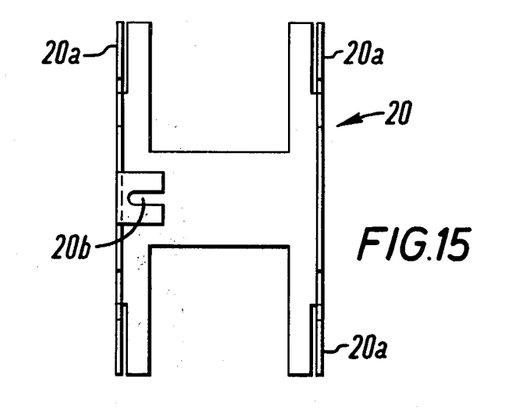
FIG. 15 is a plan view of the counter locking plate.

The pinions 12 are each made with eight teeth, every other tooth being removed for half the face width to the root diameter 12a as shown in FIG. 14. Two of the counter pinions 12 are free to rotate on the counter pinion shaft 10 but the third counter pinion located at the front of the mechanism nearest to the plate 3 is pinned to the counter pinion shaft 10. The axial position is fixed by switch cams 11 which are also pinned to the shaft 10, together with a limit cam 41 fitted on the shaft 10 in front of the counter front plate 3. ;p In order to retain the counter gear assemblies in the correct mesh with the corresponding counter pinion 12 there is provided a counter locking plate 20 (FIG. 15) which at each end has a profiled shape and two open ended side slots 20a (see FIGS. 3 and 4). These slots allow the locking plate 20 to be positioned over the two bottom support pillars 6 of the counter and to slide laterally. In the central position as shown in FIG. 4 the profiled shape of the ends of the plate retain the bushes 39 and thus the counter shaft 18 in the correct driving position, but lateral movement of the plate 20 frees the counter shaft and it can then be displaced against the springs 21 to cause the counter gear assemblies to come out of mesh. The locking plate 20 has a further slot 20b formed in its front face (see FIGS. 3, 12 and 15) which is engaged by a pin 76 in drive pinion release shaft 25. Shaft 25 is located in a boss 26 and the pin 76 is normally in a vertical slot 26a which is formed in the boss 26 and is open towards the plate 2. The release shaft 25 extends in one direction through the front plate 4 (FIGS. 2 and 12) and in the other direction to abut the resiliently mounted drive pinion 22 which holds the release shaft 25 in position (FIG. 12).

Rotatably mounted on the counter unit plate pillars 6 and axially located between the counter front and back plates 2 and 3 (FIG. 1) is a switch operating plate 8 which extends to abut the switch cams 11 (See FIG. 3).

Attached to the counter back and front plates 2, 3 outboard of the switch operating plate 8, but operable by it is a set of switches, which are shown by the references 97 or 98 (FIGS. 1 and 3).

Two types of switch have been shown but obviously any similar type of switch can be used. Similarly varying numbers of switches can be fitted. By adding a further switch operating plate 9 (FIG. 1) and a switch cam 11a on shaft 10 behind the counter back plate 2 an extra switch 98a can be accomodated.

The switches 97 and 98 are usually referred to as auxiliary switches because they are used for functions other than the direct control of the actuator, this being accomplished by the switches 61a and 62a which act as combined torque/limit switches as will be hereinafter described. Because the switches 97 and 98 are auxiliary switches, operating such functions as indicating lamps, interlocking and subsidiary circuits, it is essential that they are always operated by the counting mechanism irrespective of whether torque or limit has been selected and always a little before the combined torque/limit switches are operated. For these reasons switches 97 and 98 are operated by separately operated switch operating plates 8 and the switch cams 11 are so positioned to operate the axiliary switches 97 and 98 slightly before the combined torque/limit switches 61a, 62a.

Figure 6A:
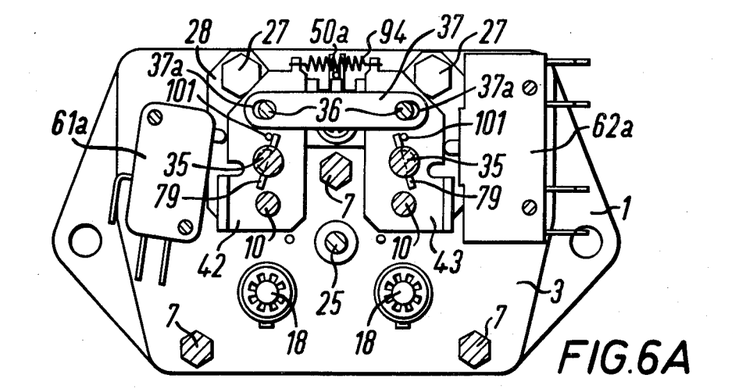
FIGS. 6A, 6B and 6C are sectional views corresponding to those of FIGS. 5A, 5B and 5C but taken on line D—D of FIG. 4.
Figure 6B:
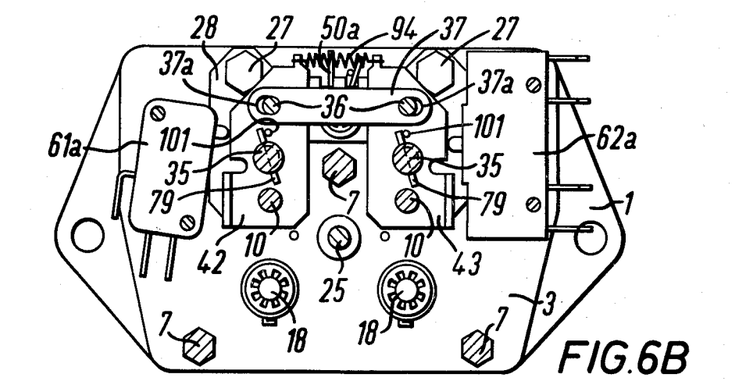
Figure 6C:
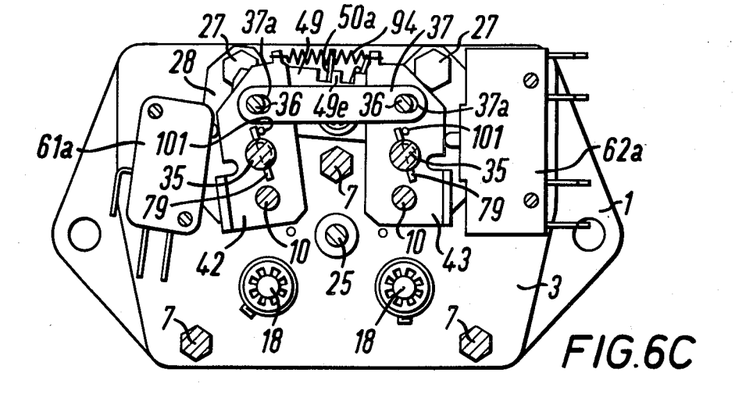

The combined torque/limit switches 61a, 62a are positioned in front of the counter front plate 3 as shown in FIG. 6.

Pivotally mounted on an extension of the counter pinion shaft 10 between the counter front plate 3 and the front plate 4 (FIG. 1) is a torque/limit actuator 42 (lefthand) which is shown more clearly in FIGS. 6 and 16 and which abuts the torque/limit close switch 61a; and carried in the torque/limit actuator 42 is torque/limit shaft 35 (FIGS. 4 and 5) which is used to select "torque" or "limit" operation as will be described hereinafter in greater detail. The counter front plate 3 also carries the limit cam plate 28 which is pivotally mounted by pivot pin 27 to the end of the counter plate pillar 6 and is shaped so that a lug abuts the limit cam 41 and another lug 28a abuts the torque/limit shaft 35 when in its "limit" selected position.

The above description as previously mentioned is for the "close" side counting mechanism only, the "open" side is exactly the same but of opposite hand and operates in the opposite direction. The only common connection between the two counting mechanisms is the common drive pinion 22 and the interlocking mechanism at the front which will be described later in connection with Features 4 and 5 of the invention. The common drive pinion 22 has eight teeth, the same as the counter pinions 12 on the counter pinion shaft 10.

Method of Operation (Description for "close" side only)

As viewed from the front plate 4 (FIG. 2) the common drive pinion 22 rotates in an anti-clockwise direction for "close" operation and drives the first counter gear assembly 13 (i.e. the assembly closest to the plate 2) clockwise which causes it to freely rotate on the counter shaft 18, the pawl 15 being inoperative in that direction. The first counter pinion 12 is positioned in relation to the first counter gear assembly so that two full teeth of the counter pinion 12 rest on the plain periphery (middle third section) of the counter gear assembly and no driving motion takes place until the two full teeth on the front face of the counter gear assembly pick up a full tooth on the corresponding counter pinion 12 and cause it to rotate two full teeth (i.e. 90°). The second counter gear assembly is positioned relative to the first counter pinion 12 so that one of the full teeth of the first counter pinion 12 engages with one of the full teeth on part 13B of the second counter gear assembly. Thus for every turn of the first counter gear assembly the first counter pinion 12 rotates 90° (i.e. two tooth pitches) and so causes the second counter gear assembly also to move two tooth pitches, therefore the first counter gear assembly makes four turns for one turn of the first counter pinion 12, which because of its ratio to the second counter gear assembly of 2½:1 has to turn two-and-a-half turns for one turn of the second counter gear assembly. This means that for ten turns of the first counter gear assembly the second counter gear assembly turns once.

The relationship between the second and third counter gear assemblies is the same, therefore the second counter gear assembly rotates ten times for one turn of the third counter gear assembly driving through the second counter pinion 12 on the shaft 10. The gears continue to drive until the three counter gear assemblies reach a position in which the teeth which extend the full width on the gears are all exactly in line in the top-most position (i.e. in mesh with all three pinions 12 simultaneously) when the third counter gear assembly will cause the third counter pinion 12 to rotate, thus all the gears will rotate and a movement of 90° in an anticlockwise direction will be imparted to the counter pinion shaft 10 because the third counter pinion 12 is fixed to it. The 90° movement will also be imparted to the switch cams 11 which push against the switch operating plate 8 to depress the switches 97 (see FIG. 3). The limit cam 41 is also caused to rotate in an anticlockwise direction which thereby imparts movement to the limit cam plate 28 and this movement is transferred to the torque/limit shaft 35 (when in the "limit" selected position) and because the torque/limit shaft 35 is located in the torque/limit actuator 42, the movement finally moves the torque/limit actuator 42 to operate the torque/limit switch 61a. It is so arranged that the torque/limit switch 61a is operated fractionally after the other switches 97. The number of turns which the mechanism can count is from 1 to 250 turns of the common input pinion 22, calculated as follows:

Ratio of input pinion 22 to the first counter gear assembly = 20/8 = 2½:1

∴ input pinion turns 2½ = 1 turn of first counter gear assembly 10 turns of first counter gear assembly = 1 turn of second counter gear assembly 10 turns of second counter gear assembly = 1 turn of third counter gear assembly ∴ maximum number of turns of input pinion 22 = 2½ × 10 × 10 = 250

The final drive pinion 12 rotates through 90° in the action of operating the corresponding switches and must return through that 90° and travel also a further 90° to operate the opposite switches giving an absolute minimum of 180° rotation, but adding allowance for backlash and tolerances the minimum number of turns can be said to be one turn.

There is an overall ratio from minimum to maximum of 250:1 therefore by varying the gear ratio from the actuator output to the switch mechanism drive pinion 12, a wide range of valve turns can be accomodated. Any over-run of the drive after the switches have been operated is not damaging to the mechanism because the counter gear assemblies will continue to rotate without losing any setting and will return to exactly the same point of operation every time. It must be remembered that the operation of the "close" side of the mechanism has been described and that while the "close" side is operating and counting, the "open" side of the mechanism is also engaged and driving but counting in the reverse mode so that it is correctly positioned for its own counting sequence. The above description of the method of operation assumes the mechanism to have been set but the following is the setting procedure for any valve which can be accomplished without the knowledge of the number of turns the valve requires for correct operation.

Although provision has been made as mentioned above for all adjustments and settings to be achieved by means of a screwdriver in the slotted ends of the shafts (see FIG. 2), it will be understood that other methods are possible for obtaining these adjustments and other settings.

In setting up the mechanism for the "close" procedure, after the actuator has been mounted to the valve and the mechanism checked to be driving correctly, the valve is moved for example, to the properly "closed" position.

The drive pinion release shaft 25 is then pushed inwardly to disengage the pin 76 from the open sided slot in the boss 26 and is then rotated in an anticlockwise direction. This action slides the drive pinion 22 out of driving engagement with the first counter gear assemblies and the pin 76, being also engaged in the slot of the counter locking plate 20 (FIG. 3), moves the counter locking plate 20 laterally, freeing the bushes 39 and thus the counter gear shafts 18 and the counter gear assemblies from positive engagement, being only held in position by the counter shaft spring 21. This operation is indicated on the front plate by the label "FREE DRIVE" on shaft 25 (FIG. 2).

The counter gear shaft 18 is then rotated clockwise, as indicated on the front plate by the label "SET LIMIT", and this action results in each counter gear assembly in turn being drivably connected to the counter gear shaft 18 in that each pawl 15 is urged into the groove 18a in the counter gear shaft 18 by the action of the pawl spring 16 until the three counter gear assemblies are all connected to the counter gear shaft 18 with the through teeth exactly in line, and continued rotation eventually causes the counter pinions 12 to rotate with the counter pinion shaft 10, switch cams 11, (the same action as described in the switch operation) and also limits cam 41 until the switches 61, 61a are operated. Should overadjustment occur by rotating the counter gear shaft 18 too far, continued rotation will allow the setting point to be re-achieved within 360°. The counter gear assemblies are forced out of mesh during this procedure to allow the gears to be lined up and this is achieved by the bushes 39 being forced down into their slots against the counter shaft spring 21.

The "close" switches are now set and the input pinion must be re-engaged. This is done by rotating the drive pinion release shaft 25 in the opposite direction (i.e. clockwise) to return the counter locking plate 20 to its central position, and allowing the driving pinion release shaft 25 to return outwards under the spring force from the drive pinion 22 which drivably re-engages with the first counter gear assemblies and allows the pin 76 to return into its slot in the bush 26.

The valve is then moved to its properly "open" position when exactly the same procedure is adopted for setting up the mechanism except that the directions of rotation are opposite as indicated on the labels on the front plate of the unit.

FEATURE 2

Torque switch operation and adjustment

The torque produced at the output shaft of the actuator is controlled by utilizing the axial movement of the wormshaft as previously mentioned to operate a linkage connection to the switch mechanism.

The axial movement of the wormshaft is the result of the reaction of the wormshaft, due to the load on the wormwheel, against a resilient means, and as the output torque increases so the wormshaft axial movement increases and it can be in either direction depending on the direction of rotation of the actuator output shaft.

By providing some adjustable lost motion in the linkage between the wormshaft and the torque/limit switch the amount the wormshaft moves before the torque/limit switches are operated can be controlled, and thus the torque produced at the output shaft.

Considering as before the "close" direction only, the torque/limit switch 61a is directly operated by the torque/limit actuator 42 as it is when operated on "limit" from the counting device, but the means by which it is moved is different.

The torque/limit actuator 42 is formed as a U-section (see FIGS. 6 and 16) and carries through the extended arms of the U, a torque adjustment pin 36 (see FIG. 6). The torque adjustment pin 36 has attached to its forward extension by pin 80 a torque adjustment pointer 31 which carries a torque adjustment locking screw 32. In order to provide some frictional locking, two disc springs 67 are located under slight compression, between the pointer 31 and the locking plate 30. Situated between the arm of the U of the torque/limit actuator 42 and located on the adjustment pin 36, are the torque cam spacer 33 and a torque cam 38 and these are retained in position by a lock washer 70. The torque cam 38 is rotatably engaged with the adjustment pin 36 by means of a spring pin 91. Mounted on the front face of the counter back plate 2 is a torque link pivot bracket 34.

Figure 7:
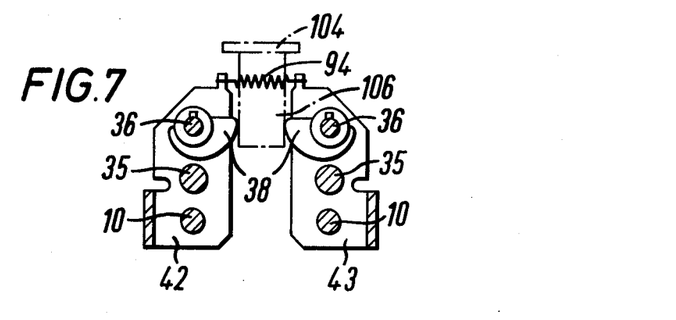
FIG. 7 is a section on the line H—H of FIG. 4.
Figure 8:
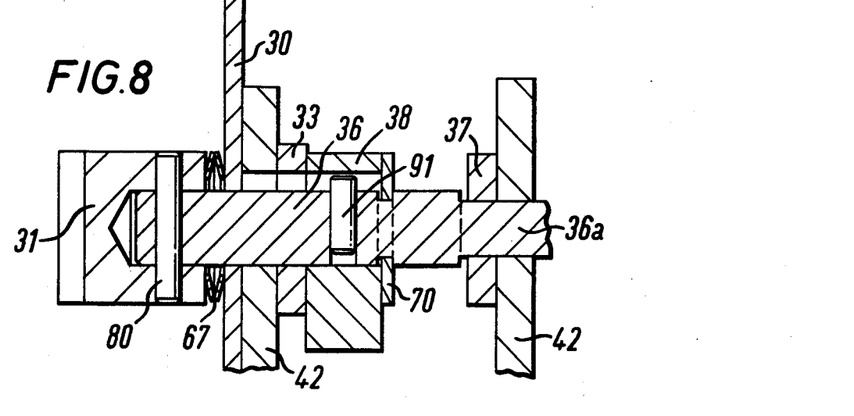
FIG. 8 is a detail on an enlarged scale of the section of FIG. 4 marked "F"
Figure 17A:
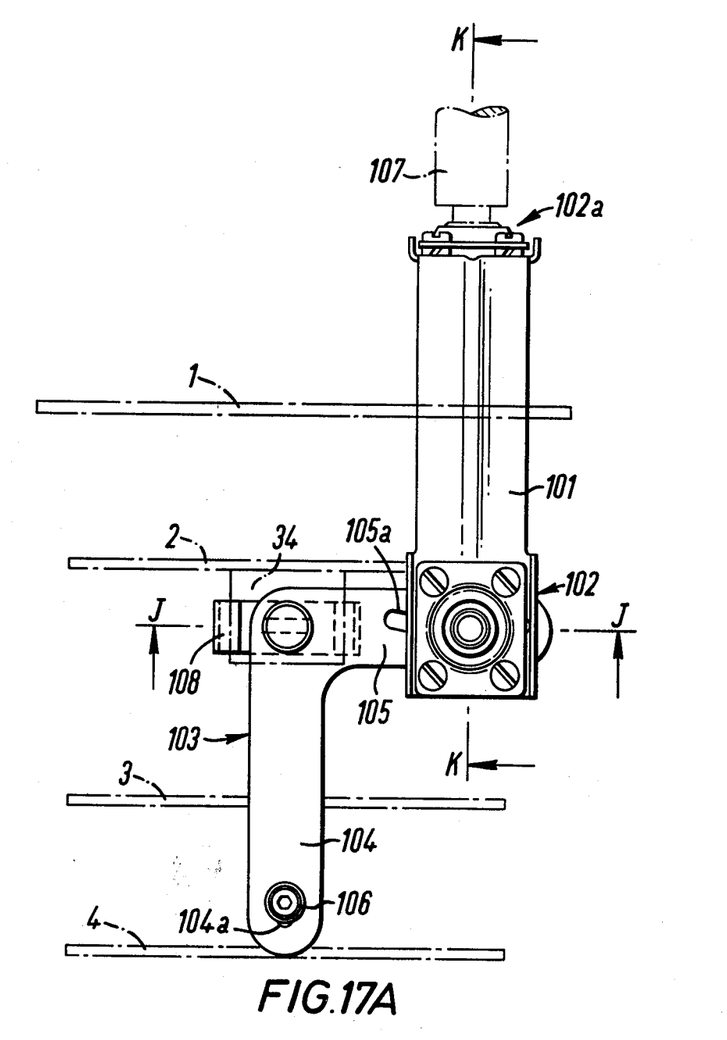
FIG. 17A is a plan view showing various views of the torque linkage connecting the wormshaft with the torque cams for operating the torque/limit switch actuator.
Figure 17B:
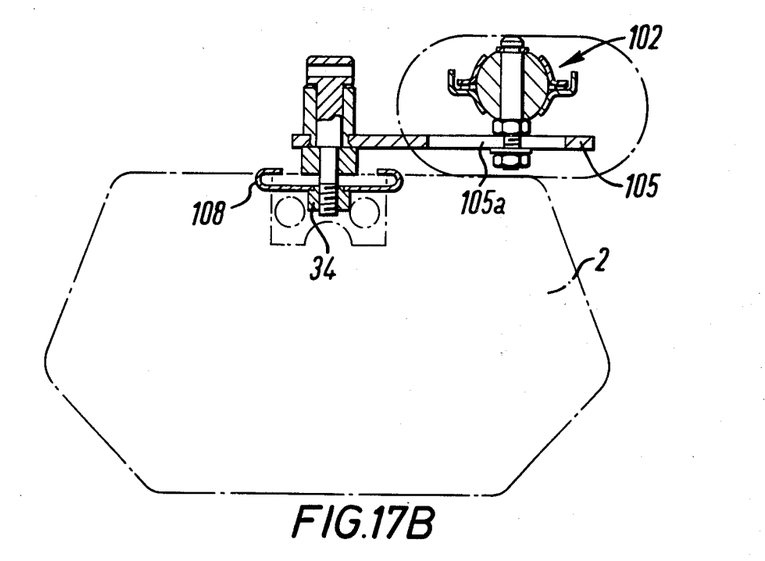
FIG. 17B is a sectional elevation on the line J—J of FIG. 17A.
Figure 17C:
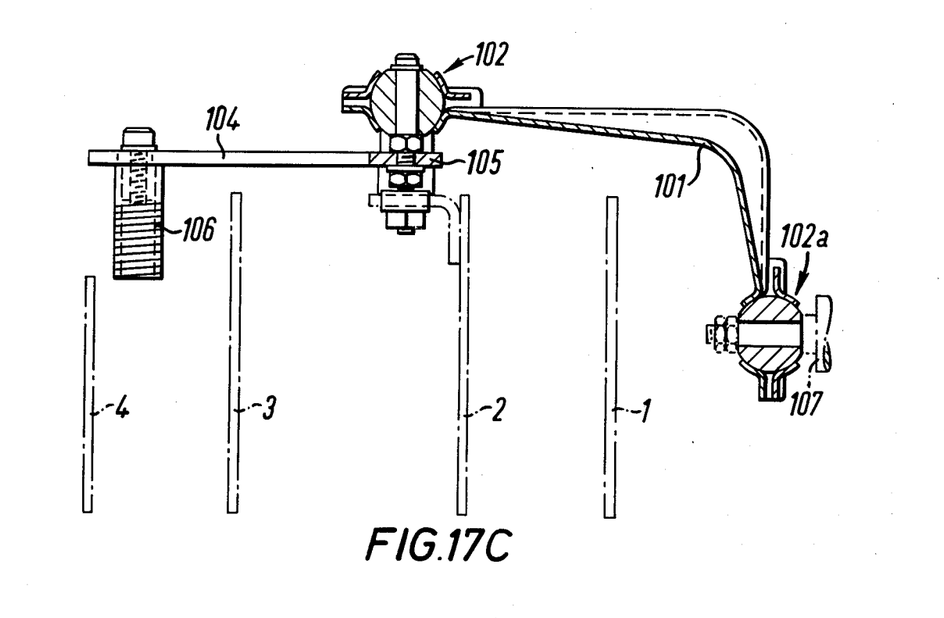
FIG. 17C is a sectional view on the line K—K of FIG. 17A.

The torque linkage is shown in FIGS. 17A, 17B and 17C and referring to these drawings it will be seen that there is a torque crank link 103 pivotally mounted on the pivot bracket 34, the link 103 being formed in the shape of a right angle, one arm 104 of which extends along the switch mechanism while the other arm 105 is located to the side. The arm 104 which extends along the switch mechanism has fixed to its end, the torque spring 106 which projects downwardly between the "close" and "open" torque cams 38 (see FIGS. 1 and 7). The position of the spring 106 can be adjusted longitudinally in the slot 104a provided in the arm and the spring 106 is an overtravel spring whose function will be described hereinafter.

The other arm 105 of the torque crank link 103 is provided with a slot 105a to which is pivotally mounted a spherical bush 102. The position of the bush 102 can be adjusted anywhere within the slot length but it can be rigidly locked at the selected position.

The spherical bush is rotatably mounted in one end of the torque transfer bracket 101. This bracket 101 is also formed as a right-angle and at its other end it has similarly mounted spherical bush 102a. This second bush is rotatably attached to the end of the wormshaft 107 as indicated in FIGS. 17A and 17C.

The method of operation of the torque switch linkage is as follows. When the actuator drives the valve and the torque being applied by the wormwheel causes the wormshaft 107 to move axially, its direction is dependent on whether the actuator is driving "open" or "close", as indicated.

The axial wormshaft movement is translated into a radial movement of the torque crank link 103 by means of the universally mounted torque transfer bracket 34. This movement causes the torque spring 106 which projects downwardly between the torque cams 38 to impart a movement through one or other of the torque cams 38 to one or other of the torque/limit actuators 42 so as to operate one or other of the torque/limit switches 61a, 62a, which thus de-energises the motor to stop the actuator.

The output torque transmitted by the actuator is proportional to the amount of the axial movement of the wormshaft. This movement is controlled by varying the amount of free movement between the torque spring 106 and the torque cams 38. This is done by rotating the torque cams 38 against a graduated scale, whereby the shape of the torque cams varies the amount of free movement.

Once the correct torque has been selected the setting can be locked by screwing in the torque adjustment locking screw 32 which then prevents accidental movement of the corresponding torque cam 38. Any further movement of the wormshaft after the torque/limit switch 61a, 62a, has been operated, due to over-run or any other malfunction, is prevented from damaging the mechanism by the deflection of the torque spring 106, which is so designed as to be strong enough to operate the mechanism and to deflect during overtravel without causing damage. The mechanism is so arranged that whatever mode of operation is selected the torque mechanism will always over-ride and operate giving complete protection to both actuator and valve.

FEATURE 3

The switch mechanism provides an anti-hammer function operable at any time during the valve stroke. The following description is for the "close" side only.

Many actuators with worm or spur and helical gear drives use ratios which are reversible. That is to say, under load the wormshaft (for example) deflects axially against a spring to measure the load applied and to operate the torque device in the switch mechanism and when the torque switch operates and the motor is de-energised the driving force on the gears is released and due to the action of the spring on the wormshaft, it can, because of the reversibility of the gearing, return to its neutral position which would allow the torque/limit switch to re-set. Should the electrical circuit to the motor be such that the re-setting of the torque/limit switch re-energises the motor, then the actuator would restart, re-apply the load to the valve, cause the wormshaft to move axially again and so re-operate the torque/limit switch. The repetition of this cycle due to the reversible gearing and the re-energising of the motor causes a continuous "stop-start" process resulting in axial hammering of the wormshaft. The switch mechanism of the present invention has a device which prevents this action and it is known as "anti-hammer".

A latch release shaft 48 (FIGS. 12 and 16) is rotatably mounted in the counter back plate 2 and front counter plate 3. On the projection of the latch release shaft through the front counter plate 3 is carried a latch member 49 (see also FIG. 5). This latch member is provided with pawls 49a and 49b, and cut outs 49c and 49d. Rearward extensions 36a of the torque adjustment pins 36 project rearwardly through the rear arm of the U-shaped torque/limit actuators 42 and through the cutouts 49c and 49d of the latch 49 respectively.

Pinned to the extension of the latch release shaft 48 is latch spring collar 60 (see FIG. 12) and located on the latch spring collar 60 behind its flange is the latch spring spacer 59. Spacer 59 is formed with a slotted lug 59a into which engages the extended leg of a latch spring 53. The latch spring 53 is formed as a helical coil spring and is also positioned on the latch spring collar, being axially compressed between the counter front plate 3 and the latch spring spacer 59 to provide a friction force between the latch spring spacer 59 and the latch spring collar 60.

Mounted on the further extension of the latch release shaft 48, through the central hole of the latch 49 and abutting the latch spring collar 60 is a bush 75. Located around the flange of the bush is a latch operating spring 50 formed with two projecting legs 50a which abut either side of a lug 49e formed on the top edge of latch member 49.

The whole assembly is retained in position by a circlip 89. The rearward projection of latch release shaft 48 through the counter back plate 2, carries a spring pin 77 driven through and projecting equidistant each side. Abutting this spring pin 76 and rotatably mounted on the latch release shaft 48 is latch release gear 47 which is retained by self-locking ring 71. Projecting through the face of the latch release gear is a spring pin 91, positioned so that rotation of the latch release shaft will cause spring pin 76 to contact spring pin 91 and rotate the latch release gear 47 but allowing almost a turn of lost motion when changing direction. Latch-release gear 47 is drivably engaged with drive gear 44 pinned to the drive shaft 24 (FIG. 12).

In operation when the actuator is driving, in the "close" direction, the drive shaft 24 rotates in an anti-clockwise direction when viewed from the front of the control unit and thus the latch release gear 47 rotates in a clockwise direction. The lost motion between the latch release gear 47 and the latch release shaft 48 will have been taken up and the latch release shaft 48 will also rotate in a clockwise direction.

Due to the friction force between the latch spring collar 60 and the latch spring spacer 59 caused by the compression of the latch spring 53, the clockwise rotation is transmitted to the latch spring spacer 59 and thus to the latch spring 53 by means of its extended leg 53a located in the lug 59a on the latch spring spacer 59.

Figure 5A:
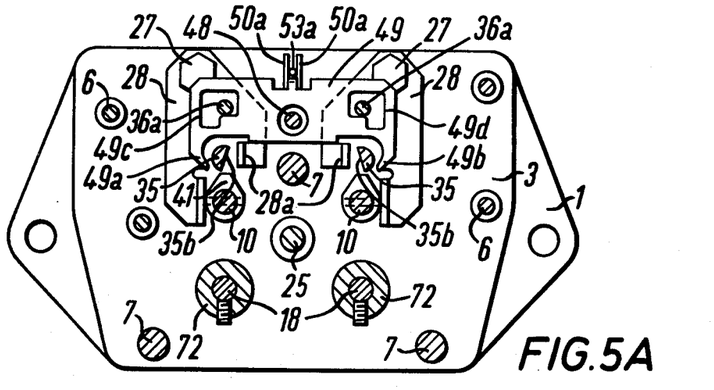
FIG. 5A is a section on the line E—E of FIG. 4 showing the switch mechanism in its inoperative position.
Figure 5B:
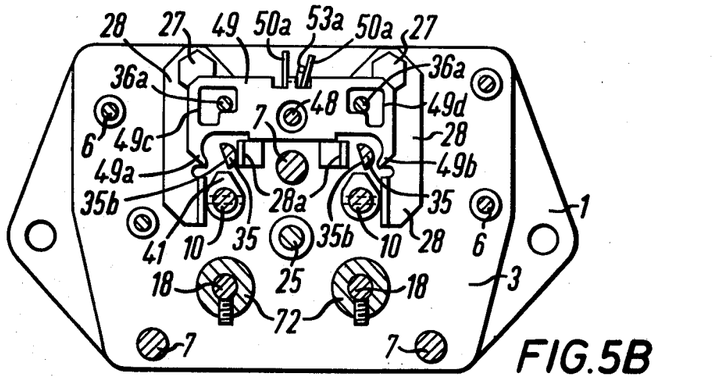
FIG. 5B is a section similar to FIG. 5A showing the switch mechanism driving in "close" direction.

The latch spring leg 53a thus contacts one of the latch operating spring legs 50a and this in turn causes the other leg to apply a turning force to the latch 49, through lug 49e. Although a turning force is applied to the latch member 49 no movement takes place because the bottom edge of cut-out 49c contacts the torque adjustment pin extension 36a. The position is as shown in FIG. 5B.

Figure 5C:
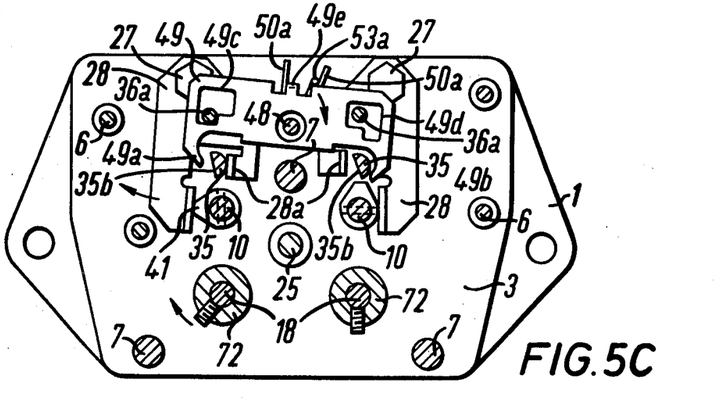
FIG. 5C is a further section similar to FIGS. 5A and 5B showing the mechanism operated in "close" direction with the latch engaged.

However when the torque/limit actuator 42 is moved angularly outwardly so as to operate the torque/limit switch 61a, either by limit drive or torque operation, the torque adjustment pin extension 36a also moves outwardly until the shape of cut-out 49c allows the latch member 49 to be rotated until the torque adjustment pin extension 36a abuts the lower edges of cut-out 49c. The position is as shown in FIG. 5C where the cam 41 has moved to rotate limit cam plate 28 as shown in FIG. 5C clockwise and actuator 42 anti-clockwise about shaft 10 as shown in FIG. 6C.

The actuator during this time has stopped rotation, by means of the torque/limit actuator 42 operating the torque/limit switch 61a, and the gear drive, if reversible, has returned to its neutral position.

The torque/limit switch 61c has not been allowed to reset because the torque/limit actuator 42 is prevented from returning by the torque adjustment pin extension 36a being locked in the bottom of cut-out 49c.

Thus, the actuator cannot be restarted in the same ("close") direction and will remain in this position until the actuator is caused to move in the opposite ("open") direction and some "open" movement has taken place. In moving in the "open" direction the drive shaft 24 rotates in a clockwise direction and the latch release gear 47 in an anti-clockwise direction. Because of the lost motion between the spring pin 91 in the latch release gear 47 and spring pin 77 in the latch release shaft, almost a complete turn of the gear takes place before any rotation of the latch release shaft 48 commences. This allows the actuator to make some positive movement in the "open" direction before the latch release mechanism operates.

When the lost motion has been taken up and the latch release shaft 48 moves in an anticlockwise direction, a reversal of the turning force on the latch member 49 takes place, by means of the extended leg 53a on latch spring 53 abutting the opposite leg 50a of the latch operating spring 50. This causes the latch member 49 to return to its neutral mid-position releasing the torque adjustment pin extension 36a and thus allowing the torque/limit actuator 42 to also return to its neutral position under the action of return spring 94.

It can be seen that because the torque/limit actuator 42 is moved to operate the switch 61a either by torque or limit that wherever in the stroke of the valve, either mode causes movement of the torque/limit actuator 42 and the switch 61a once operated, will not reset until reverse movement of the actuator takes place.

FEATURES 4 & 5

Torque switch latch and cut-out at any point during valve stroke (Description for "close" side only)

It is possible that after a valve has been closed for some time that it requires increased or excess torque to open the valve due to wedging, clogging, corrosion, etc.

If the actuator is energised to open the valve in this situation it is possible that due to the high initial load, the wormshaft will deflect fully and cause the "open" torque/limit switch to be operated before the actuator has had time to unseat the valve and cause any opening movement.

In order to prevent this happening, some means must be found to prevent the "open" switch being operated (torque switch latch) or the switch must be by-passed until the actuator has unseated the valve and is moving (torque switch cut-out). This function is normally done electrically, but a method of combining these functions is included in the switch mechanism of the present invention.

Figure 16:
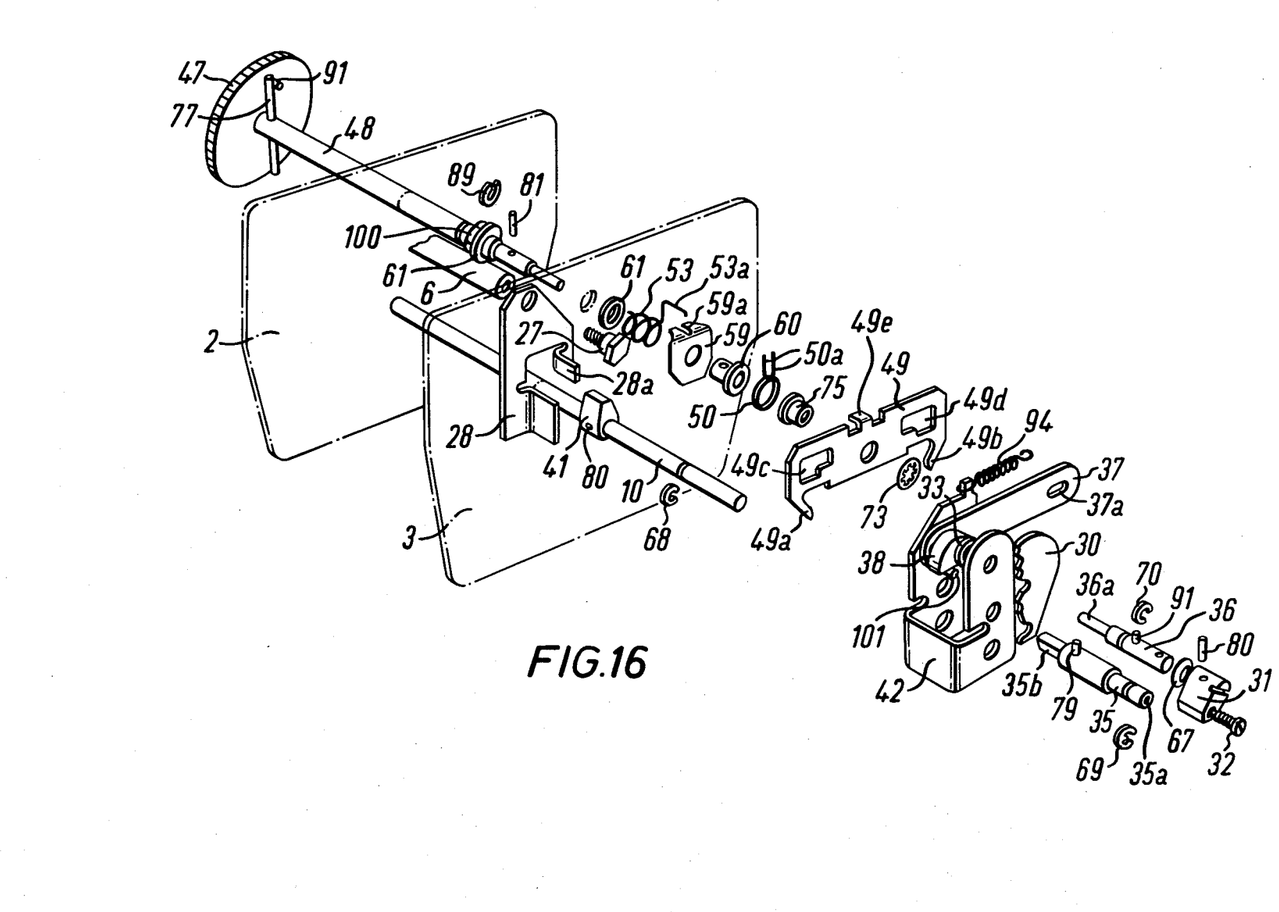
FIG. 16 is an exploded perspective view of the close side switch actuating mechanism showing in particular the U-shaped torque/limit switch actuator member and the latch member.

The left-hand torque/limit actuator 42 and the right-hand torque/limit actuator 43 are interconnected by a torque link 37 (see FIGS. 6 and 16). Each end of the torque link 37 has a slot 37a in which the extension 36a of the torque adjustment pin 36 locates and the link 37 is retained with lock washers 73. The link 37 has a controlled lateral movement restricted by the lengths of the slots.

In the method of operation of this part of the mechanism it is necessary to consider that the actuator has closed either by torque or by limit as described previously in connection with Feature 3 of the invention. In this situation the torque/limit actuator 42 has moved over to operate the "close" torque/limit switch 61a (FIG. 6C) and the latch member 49 has rotated to lock the torque/limit actuator 42 against the switch 61a (FIG. 5C). In carrying out this movement the torque adjustment pin 36 has also been caused to move to the "close" side (carried by the torque/limit actuator 42) and in so doing has moved along in the corresponding slot 37a in the torque link 37 until it abuts the end of the slot and then has moved further causing the torque link 37 to move laterally until the end of the slot in the other end of the torque link has contacted the torque adjustment pin 36 in the "open" side.

This protective device comes into action only when the torque function in one direction is operated immediately after movement has commenced away from an end position and the mechanism is operating within the lost motion on the latch release shaft 48.

Because the "close" torque/limit actuator 42 is prevented from moving off the switch 61a by way of its latch member 49 and the torque link 37 is being held in contact with the "open" torque adjustment pin 36 the "open" torque/limit actuator 43 cannot be moved to operate the "open" torque/limit switch 62a.

When the actuator motor is then energised to make the actuator drive in the "open" direction to unseat the valve, the full motor power is available and the axial movement of the wormshaft can take place without causing the "open" torque/limit switch 62a to be operated. The movement of the wormshaft is lost in deflecting the torque arm spring 106 connecting the torque arm to the front torque link.

The "open" torque/limit actuator 43 is held latched out as described until such time as the actuator has rotated sufficiently to cause the "close" latch 49 to be disengaged as described previously under Feature 3 when the "open" torque/limit actuator 43 is freed to operate the "open" torque/limit switch 62a under normal conditions.

A further feature involving the use of latch 49 is when the mechanism has operated in one direction, for example, the "close" direction, the latch having tripped and engaged and due to a malfunction of the switch or because of high speed operation and incorrect setting of the mechanism over-runs in the same direction before stopping. During this time the "close" torque/limit switch 61a remains operated and the latch remains engaged, and because of the torque link 37, the "open" torque/limit switch 62a remains inoperable as previously described.

The actuator can now be operated in the "open" direction, the latch 49 will be disengaged, the torque/limit switch actuator 43 will be released and will return to neutral. It is possible at this point for the mechanism to be operated immediately by torque in the "open" direction in which case the latch will operate as previously described maintaining the "open" torque/limit switch 62a operated and preventing the "close" switch 61a from being operated.

The actuator can now only be driven in the "close" direction and should this be done, because the mechanism is already latched in the "open" direction the mechanism is unprotected, the "close" torque limit switch being inoperable.

To overcome this, the mechanism is so designed that the latch 49 can be mechanically disengaged.

Because the "open" torque mechanism has operated immediately after release of the "close" latching and the mechanism is now restarting to drive in the "close" direction, the limit cam 41 is primed ready to rotate to operate the "close" torque/limit switch, as previously described, and as it does it will contact the projection 49a on the latch 49 and lift it into its neutral or unlatched position allowing the "close" torque/limit switch 61a to be operated.

FEATURE 6

Torque/limit selection (Description is for the "close" side only)

Having combined the torque and limit functions of an actuator into one switch mechanism to operate one switch only in each direction for actuator control only (the torque/limit switches 61a and 62a), it is then necessary to be able to select the mode of operation for these switches according to the valve requirements. Although the torque mechanism is always operable and overrides any selection it is necessary to be able to choose operation by "limit" and this is done by using the torque/limit selector (see the top of the front plate 4 in FIG. 2).

The torque/limit shaft 35 is carried in the torque/limit actuator 42 (see FIG. 7) and is positioned between the extension of the counter pinion shaft 10 and the torque adjustment shaft 36. The torque/limit shaft 35 projects forwardly to the torque/limit actuator through the front plate 4 and is provided with a drive slot 35a for rotation and projects through the rear of the torque/limit actuator 42 (FIG. 4). It is retained by a lock washer 69 and is provided with a rotational stop in the form of a pin 79 driven through its diameter and projecting each side which can abut against a pin 101 in the torque/limit actuator 42, to provide 180° of movement. The end 35b of the torque/limit shaft 35 which projects through the back of the torque/limit actuator 42 is shaped to a semicircular form by removing half of the diameter for a short length (see FIG. 5).

In the method of operation of this part of the invention, when the switch mechanism has counted the number of turns for which it has been set as previously described in connection with Feature 1, the counter pinion shaft 10 is caused to rotate through 90° and in so doing causes the limit cam 41 to rotate also through 90° and this pushes the limit cam plate 28 to the left as viewed from the front of the control unit. This causes the second lug 28a on the limit cam plate 28 to move towards the torque/limit shaft 35 (see FIG. 5).

If the torque/limit shaft 35 has been turned clockwise to its stop as indicated on the front plate, the torque/limit shaft 35 presents the full radiused part of the semicircular extension 35b to the lug 28a on the limit cam plate 28 (see FIGS. 5B and 5C) and the limit cam plate 28 in continuing its movement will contact the torque/limit shaft 35 and move it to the left also and by virtue of its mounting in actuator 42 will move the torque/limit actuator 42 to operate the torque/limit switch 61a, when the anti-hammer and torque switch latches come into effect.

On reversal of the drive the limit cam 41 returns through 90° to release the limit cam plate 28 and the mechanism returns to its neutral position.

If the torque/limit shaft 35 is rotated to its stop in an anti-clockwise direction to the torque position, the flat part of the torque/limit shaft end is presented to the lug 28a of the limit cam plate 28 (see FIG. 5A) which will continue its movement therefore without contacting the torque/limit shaft 35 and the torque/limit switch 61a will not be operated, although the secondary or auxiliary switches 61 will still be operated by the switch cams 11 by means of the switch operating plate 8.

All the foregoing descriptions of the Features 1 to 6 of the invention have been given solely for the "close" direction of movement of the associated actuator but the switch mechanism is made of two distinct parts, one for the "close" direction and the other for the "open" direction. The "open" side operates exactly as the "close" side but is reversed in direction and handing. The only direct connection between the two sides of the unit is the common drive pinion 22 and the torque link 37 provided for the interlocking (Features 4 and 5 of the invention).

FEATURE 7

In order to provide a visual indication that the actuator is moving and the valve operating, a cam operated switch is provided connected to a local or remote lamp which by repeatedly being energised and deenergised gives a flashing indication of valve movement.

Figure 13:
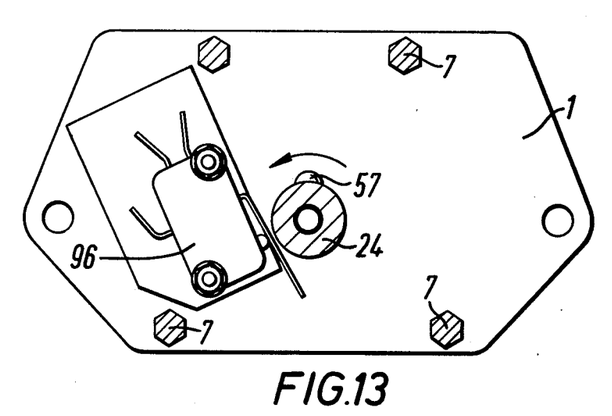
FIG. 13 is a section on the line G—G of FIG. 12.

A headed pin 57 is positioned in the drive shaft 24 (see FIGS. 12 and 13) and has positioned adjacent to it a switch 96. The switch 96 is so positioned that as the head of the pin 57 passes it operates the switch and then releases it as the pin head passes. Thus when the drive shaft 24 is rotating in either direction the continual making the breaking of the switch 96 causes the associated lamp to flash indicating the operation of the actuator and associated valve.

The complete switch mechanism as now described provides a compact comprehensive control unit combining all torque and limit functions and providing also all adjustments on a single front plate where with a single tool, for example a screwdriver in the mechanism illustrated, all torque/limit selection, torque/limit setting and adjustment is obvious and simple.

Provision can be made in the control unit for up to five switches for either direction, one of which is the torque/limit switch and the other four are auxiliary switches used for associated control circuitry.

If additional switches are required, or positions other than the "open" and "close" need to be monitored then a further switch mechanism, without the torque functions and interlocks can be mounted adjacent to the basic switch mechanism and driven from it by any suitable means, and the extra switches can then be set to operate anywhere between "open" and "close" as required. This is done by presetting the valve position and setting the switches to be operated as previously described.

Feature 8

Zero Set and Scale Set

The resilient means against which the wormshaft 107 moves to measure the torque output of the actuator (as described in Feature 2) is usually a set of disc springs. Due to manufacturing tolerances variations in the performance are obtained caused by the length of the resilient means being subjected to different preloads, and the wormshaft neutral position being affected.

Normally these variations are overcome by adjusting the fastening means holding the resilient means to the wormshaft (normally a locknut). This is a difficult and tedious operation.

To overcome these problems two adjustments have been provided in the torque linkage, FIG. 17, which allow the resilient means to be assembled to the wormshaft without adjustment. As previously described in connection with Feature 2 the torque crank link 103 is pivotably mounted on the pivot bracket 34. One arm, 104, of the torque crank link carries a torque spring, 106, in a slot 104a, which allows the torque spring position to be adjusted longitudinally. The other arm 105 also has a slot 105a to which is connected torque transfer bracket 101 by way of a spherical bush 102, which can also be adjusted laterally.

Zero Set

The wormshaft with its resilient means attached, is assembled to the actuator, without adjustment and to it is connected the torque linkage as shown in the drawings of FIG. 17. The connection of the spherical bush 102 is not tightened in its slot which is free to be adjusted.

The position of the torque spring 106 between the "open" and "close" torque cams 38 is then observed and adjusted by lateral movement of jig 108 on pivot structure 34 until it is central between the two and then locked in position. This is better achieved if both torque cams 38 are set at minimum.

This setting guarantee the zero position when the wormshaft is in its neutral position.

Scale Set

Examination of the geometry of the drawings of FIG. 17 indicates that the effective length of lever arm 105 can be altered by moving the connection of the spherical bush 102 along the slot 105a in either direction and by such means the movement of the torque spring 106 resulting from the wormshaft axial movement can be varied. This allows the final torque output of the actuator to be adjusted relative to the wormshaft movement and more particularly allows the rated actuator torque to be achieved and guaranteed.

This adjustment is carried out in the final testing where the actuator can be run at the prescribed torque and the adjustment made, locked and sealed.

In the preferred embodiment the adjusting slot length is such that the output torque can be adjusted down to at least one-third of the rated torque even with the torque cams set at maximum. This allows the actuator to be sold at lower torques, as it is often necessary, without having ever to change the resilient means on the wormshaft.

Both the zero set and scale set adjustments are factory settings and would normally be done at the final testing stage and would be sealed after locking.

I claim:

1. A motor driven actuator having a control unit comprising: a motor; means coupling said motor drive shaft to an input drive shaft of said actuator; a pair of switches each connected in an electric circuit, a first of said switches controlling the operation of the motor in one direction of movement of the actuator, and a second of said switches controlling the operation of the actuator in the other direction of movement, an actuating member for each switch for operating the corresponding switch at any point during the stroke of the actuator in accordance with the output force or the output movement of the actuator, a latch member associated with said switch actuating members, said latch member being drivably connected with the input drive shaft of said control unit for movement relative to one of said switch actuating members depending on the direction of movement of the actuator, a pair of pins for normally preventing movement in a first direction, said pins being mounted one on each of said switch actuating members and being each positioned in a first location during normal operation of said actuator prior to actuation of said switches; said pair of pins being movable with its switch actuating member upon movement of the actuating member to its switch operating position from said first location to a second location in which said latch member is movable into a position in which the latch member locks the actuating member in its switch operated position, said latch member operating to prevent the release of said switch actuating member whereby a corresponding switch is reset until the actuator input drive shaft moves in the reverse direction of said first direction.

2. The actuator of claim 1, wherein each switch actuating member is operated in accordance with the output movement of the actuator by a limit cam plate which is movable in response to a cam fixed to a shaft drivably connected with the input drive shaft of the actuator.

3. The actuator of claim 2, wherein the cam shaft is the counter pinion shaft of a counter unit, the counter pinion shaft having counter pinions thereon meshing with counter gears on a counter shaft, the counter shaft of each counter unit being drivably connected with the input drive shaft of the actuator.

4. The actuator of claim 2 or 3, wherein a torque/limit shaft is mounted in each switch actuating member for engagement by the limit cam plate to operate the switch actuator, and means for selectively adjusting the torque/limit shaft in said switch actuator to prevent engagement thereof by said limit cam plate whereby said switch actuator is operable solely in accordance with the output force of the actuator.

5. The actuator of claim 1, 2 or 3, wherein a torque cam is mounted on an adjustment torque pin carried by each switch actuating member, the torque cams being each selectively adjustable on its pin relatively to its switch actuating member to vary the operation of said switch actuating member in accordance with the output force of the actuator, said torque cams operating in response to a torque member positioned between said cams and movable to engage one or other cam in accordance with said output force.

6. The actuator of claim 5, wherein the torque member is carried by an adjustable linkage, said torque member and the adjustable linkage including a resilient device, and said adjustable linkage being operatively connected with an axially movable wormshaft of said means coupling said motor to said actuator.

7. The actuator of claim 1, 2 or 3, wherein the latch member is formed with two L-shaped slots each adapted to receive the pin of a corresponding switch actuating member, said pins being normally located in a horizontal arm of said slots but being movable into a vertical arm of said slots in accordance with the movement of a corresponding switch actuating member to operate its switch whereby said latch member moves to lock said pin and thereby said switch actuating member in its operated position.

8. An actuator as claimed in claim 7, wherein the pins located in the slots of the latch member are the adjustment torque pins carried by the switch actuating members, and wherein the latch member is resiliently coupled with a release shaft driven from said input drive shaft, said latch member being movable thereby to ensure engagement of a torque pin and to release said torque pin by opposite movement of said latch member as the direction of movement of the actuator is reversed.

9. The actuator of claim 8, wherein the torque pins carried by said switch actuating members extend through elongated slots in a common link member, wherein one of the switch actuating members moves said torque link laterally by its torque pin to prevent operation of the opposite switch actuating member until said first switch actuating member has returned to its inoperative position in response to movement of the actuator in the reverse direction.

10. The actuator of claim 1, 2 or 3, wherein the input drive shaft is provided with a cam member for repeatedly operating a switch connected to a lamp so as to give a flashing indication of actuator movement.

11. A motor driven actuator assembly for controlling a valve assembly comprising:
- a motor;
- a wormgear and wormwheel drive coupling said motor to an actuator assembly;
- a control means for stopping said motor in response to an excessive travel of said valve assembly comprising at least one switch operatively connected to said motor for interrupting the current supplied to said motor;
- a switch cam for actuating said switch in response to rotation of said cam;
- counter means connected to said motor shaft, and having a drive shaft coupled to said cam, said counter means being presettable whereby said drive shaft rotates after a predetermined number of revolutions of said motor occurs indicating a predetermined travel of a valve;
- second switch means for interrupting current to said motor;
- a torque limit cam for actuating said second switch means;
- a torque limit detection means coupled to said second switch means and said wormgear, said torque limit detector means providing the rotation of the torque limit cam when said wormgear experiences a torque greater than a predetermined minimum torque; and
- latch means for maintaining said second switch means activated until a change of direction of said wormgear occurs whereby said motor is disabled inhibiting rotation of said wormgear.

* * * * *